(No Model.)
C. BOWMAN & F. W. THRONE.
MACHINE FOR COLORING AND FLAVORING CIGARS.
No. 255,921. Patented Apr. 4, 1882.
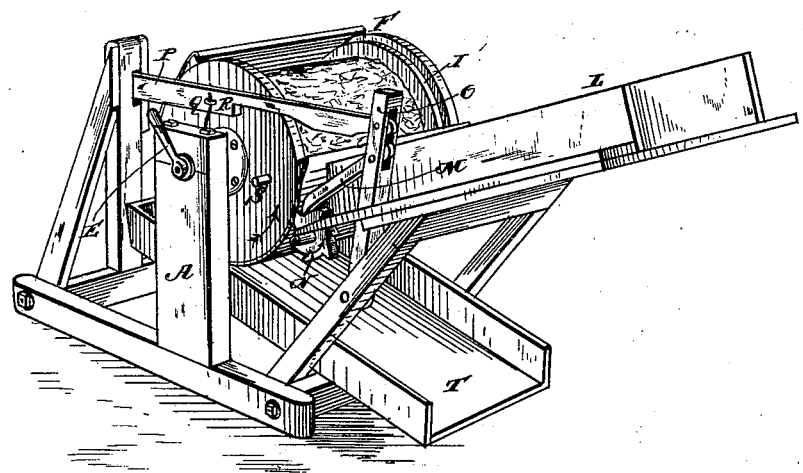
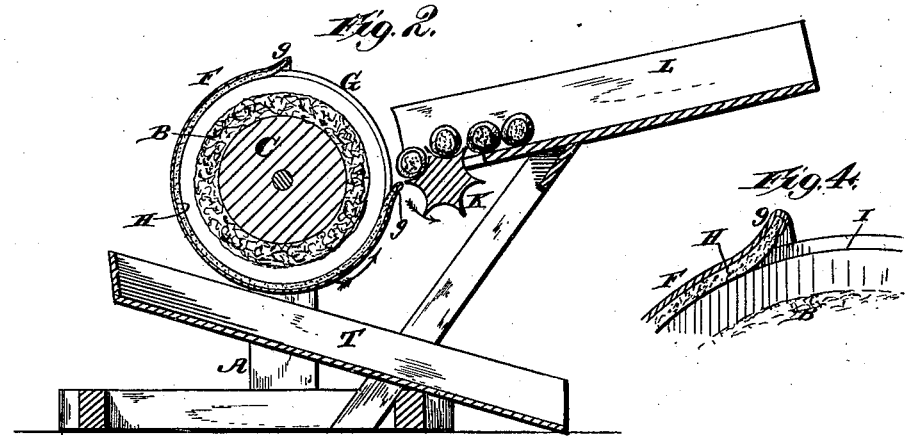
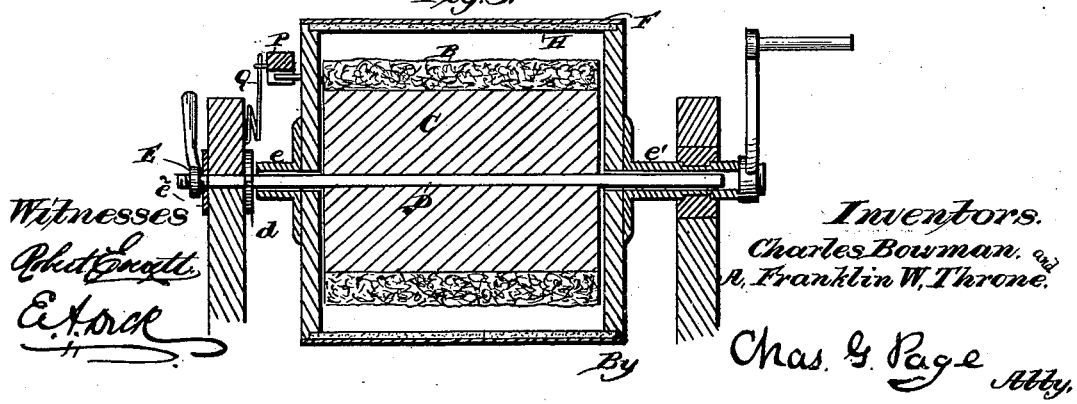

United States Patent Office.

CHARLES BOWMAN AND FRANKLIN W. THRONE, OF HANOVER, PA.

MACHINE FOR COLORING AND FLAVORING CIGARS.

SPECIFICATION forming part of Letters Patent No. 255,921, dated April 4, 1882.

Application filed February 10, 1882. (No model.)

*To all whom it may concern:*

Be it known that we, CHARLES BOWMAN and FRANKLIN W. THRONE, citizens of the United States, residing at Hanover, in the county of York and State of Pennsylvania, have invented new and useful Improvements in Machines for Coloring and Flavoring Cigars, of which the following is a specification.

The object of our invention is to provide a machine for coloring and flavoring cigars in a simple, rapid, and effective manner, and without bruising or injuring the cigars during their passage through the machine. These objects we attain by means of the devices illustrated in the annexed drawings, in which—

Figure 1 is a perspective view of the machine; Fig. 2, a longitudinal section taken on a vertical plane; Fig. 4, an enlarged view of a portion of the rotary drum or cylinder, and Fig. 3 a transverse section taken centrally through the machine.

Prior to our invention a machine has been devised for flavoring and coloring cigars in which the cigars are fed from a trough into the space between a rotary sponge-cylinder and a stationary concave, and in another instance the cigars are rolled along and colored between a yielding platen and an endless belt composed of some bibulous material, the apron being caused to travel so as to roll the cigars along; but in both of such cases the bibulous or absorbent surface containing the coloring-matter is caused to move, while in our invention the sponge-surface remains stationary. The advantages we derive from this will be seen from the following specification, taken in connection with the drawings, in which—

The letter A indicates the frame of the apparatus, which said frame will in practice be preferably made of cast metal.

B represents the sponge-cylinder, which is stationary, and which will be saturated with the liquid for coloring and flavoring the cigars.

This sponge-cylinder is fixed upon a core, C, that is rigid upon a shaft, D, running axially through the said core. One end of this shaft passes through one of the standards of the frame, and is firmly connected therewith, the means shown for effecting such connection being a collar, $d$, upon the shaft and located to bear against the inner side of the standard, and a tightening-nut, E, provided with a handle and arranged upon the shaft at the opposite side of said standard, whereby by tightening up said nut the collar upon the shaft will be firmly clamped against the standard, and thereby the shaft is prevented from rotation. As a matter of preference, a washer, $e^2$, is arranged on shaft D, between the nut and the standard, as herein shown. This sponge-cylinder is arranged within a rotary drum, F, of sufficient size to leave a space for the cigars between the sponge and its inner face. This drum is provided with hollow journals, through which the shaft passes, one of said journals, $e$, having its bearing upon the shaft, and the other, $e'$, having its bearing in one of the standards. This journal $e'$ is also extended beyond said standard, and carries a crank-handle, by means of which the drum can be rotated around the sponge-cylinder. The drum has a longitudinal opening, G, for receiving the cigars, the edges of the drum along said opening being bent outward, as at $g$ $g$, so that the cigars will be readily received and delivered from the drum and receive no injury. The drum is lined upon its inner face with a padding, H, of felt, cloth, sponge, or any other soft, fibrous, or textile material. This lining not only aids in carrying the cigars round the sponge-cylinder and insuring their rotation about their axes, so as to expose all sides of the cigar to the sponge, but it prevents that injury to the cigar which would be done by the contact of a cigar with a hard surface. The lining can be temporarily secured to the drum in any suitable manner, and in the present instance we have shown each head of the drum formed upon its inner side with an annular shoulder, I, upon which the edge of the lining is fitted.

The device for automatically feeding the cigars into the rotary drum consists of a grooved cylinder or roller, K, each groove being adapted to receive a cigar. This grooved feed-roller is located at the lower end of an inclined chute or trough, L, in which the cigars are placed, as indicated in Fig. 2. The grooved roller is arranged alongside of the rotary drum in position to deliver the cigars into the opening in the latter.

We also provide mechanism which is so timed that at each revolution of the drum it will cause the feed-roll to turn just enough to deliver one cigar into the drum. It is obvious that various arrangements of pawls and levers could be employed for such purpose. We have herein shown a pawl, M, engaging a ratchet, N, upon the axis of the grooved feed-roller, and pivoted to a swinging bar, O, to which is pivoted the reciprocatory bar P. This bar is normally held back by a spring, Q, and at the proper intervals its notch R is engaged by a stud, S, upon one of the drum-heads. Hence when this stud engages the bar the latter will be thrown forward, and in such movement will swing the bar O and cause the pawl to act upon the ratchet, so as to give a part turn to the grooved feed-roll. The cigars fed into the drum will be carried twice around the sponge, thus insuring their perfect saturation with the flavoring or coloring or flavoring and coloring liquid. Thus, let the parts assume the position shown in Fig. 2. Now, if a cigar be fed into the drum and the latter revolved, the cigar will not drop out the first time the opening in the drum comes underneath, but will remain rolling around the sponge until said opening comes below the second time. This will be understood from the fact that the drum travels faster than the cigar, so that while the cigar is in contact with and rolling round the sponge the drum will perform two revolutions before its opening and the cigar are below or nearly below the sponge-cylinder, in position for the cigar to drop out through said opening. Of course after the first cigar (supposing a cigar to be fed into the drum each time its opening comes in front of the feed-roll) a cigar will drop from the drum each time its receiving and discharge opening comes underneath; but the drum will still make two revolutions for each cigar. An inclined chute or pan, T, is arranged below the rotary drum to receive the cigars as they fall, and will be located substantially as indicated.

Other absorbent material than a sponge might be used; but we prefer the latter.

Having thus described our invention, what we claim is—

1. In a machine for coloring and flavoring cigars, a rotary drum adapted to receive and discharge the cigars, and arranged to rotate about a stationary cylinder having its surface adapted to be saturated with the liquid, substantially as described.

2. In a machine for coloring and flavoring cigars, the combination, with the inner stationary sponge-cylinder, of the rotary drum having its inner face lined with a soft padding, H, substantially as and for the purpose described.

3. The combination, with the stationary sponge-cylinder, of the rotary drum provided with an opening for receiving and discharging the cigars, and adapted to leave a space for the cigars between its inner face and the sponge-cylinder, substantially as described.

4. The combination, in a machine for coloring and flavoring cigars, of the stationary sponge-cylinder, the rotary drum, the grooved feed roll adapted to receive the cigars to be fed forward in its grooves, and mechanism timed for turning the feed-roll intermittently, so as to feed one cigar into the drum at each revolution of the latter, substantially as described.

5. The combination, with the stationary sponge-cylinder, of the rotary drum provided with hollow journals, the shaft passing through the core of the sponge-cylinder, and devices for rigidly connecting said shaft with one of the standards of the machine, substantially as described.

6. The combination, with the stationary sponge-cylinder and the rotary drum, of the grooved feed-roller, the ratchet upon said roller, the pawl, the swinging and reciprocating bars, and the stud upon one end of the rotary drum, as specified.

In testimony whereof we have hereunto set our hands in the presence of two subscribing witnesses.

CHARLES BOWMAN.
FRANKLIN W. THRONE.

Witnesses:
VINTON COOMBS,
ROBERT EVERETT.